United States Patent

[11] 3,525,279

| [72] | Inventors | Donald K. Christian<br>Spartanburg, South Carolina |
|---|---|---|
| [21] | Appl. No. | 680,702 |
| [22] | Filed | Nov. 6, 1967 |
| [45] | Patented | Aug. 25, 1970 |
| [73] | Assignee | W. R. Grace & Co.<br>Duncan, South Carolina<br>a corporation of Connecticut |

[54] DEFLATION HOLE PUNCH AND METHOD
2 Claims, 5 Drawing Figs.

[52] U.S. Cl.................................................. 83/171,
83/389, 83/568
[51] Int. Cl........................................... B26d 7/10,
[50] Field of Search........................................ 83/16, 15,
170, 171, 143, 568, 2, 389

[56] References Cited
UNITED STATES PATENTS

| 1,228,655 | 6/1917 | Eligh............................ | 83/143 |
| 2,244,550 | 6/1941 | Chandler...................... | 83/16X |
| 2,251,634 | 8/1941 | Phillips......................... | 83/16X |
| 2,322,726 | 6/1943 | Carfagno..................... | 83/2 |
| 2,748,863 | 6/1956 | Benton......................... | 83/171 |
| 3,227,854 | 1/1966 | Ramsey et al................ | 83/171X |

Primary Examiner— James M. Meister
Attorneys—John E. Toney, William D. Lee, Jr. and Edward J. Hanson, Jr.

ABSTRACT: A tear resistant deflation hole in heat-shrinkable packaging film is produced by using a heated punch in combination with a heat sink that cools the film surrounding the punched hole.

Inventor
Donald K. Christian
By William D. Lee, Jr.
Attorney

Inventor
Donald K. Christian

DEFLATION HOLE PUNCH AND METHOD

This invention relates to packaging articles in heat-shrinkable film. In particular, the invention relates to providing a tear resistant deflation hole so that when film enclosing an article has begun to heat shrink the air trapped within the film may escape thus permitting the film to shrink snugly onto the article.

When articles are packaged in heat shrinkable film the usual process is to completely enclose the article with film and then send the enclosed article through a heat tunnel to shrink the film snugly and tightly about the article. As the film shrinks down upon the article air is trapped and must be permitted to escape or else the package will have unattractive air bubbles and bulges.

Some packaging machines feed a predetermined amount of packaging film for each size of article to be wrapped. One such wrapping machine is described in my copending application entitled Packaging Machine and Method. As the predetermined amount of heat shrinkable film is fed in the wrapping machine process, a hole is punched in the film to provide a means of escape for the air in each package. This hole is usually called a deflate hole.

In manual wrapping an operator pulls film from a roll, tears or cuts off the appropriate amount of film, and then wraps the article in the film. In this instance the film can be fed through a deflate hole punch device.

Prior to the present invention deflate holes were punched in both manual and machine wrapping operations by either a hot or cold punch method. In the hot punch method the film is held taut and the heated punch is applied directly against the film. The hole is made principally by melting although some cutting probably takes place as the operation of the punch is quick and with some force.

In the cold punch method a ball punch is used to effect mechanical cutting of the film by the rapid and forceful action of the ball. This method does not require that the film be held taut.

However, holes produced by these two methods are not entirely reliable as they have a tendency to tear as the film is shrunk tightly about an article. It is thought that the tearing is a result of the unlimited film shrinking which took place in the vicinity of the hole when the punch was applied. Or, when a cold punch is used, it is thought that the tearing results from the failure of the mechanical cutting operation to produce a hole having an adequately smooth rim, i.e. very small fractures are left in the rim from which a tear can propagate during heat shrinking. Therefore, it is an object of the present invention to provide an apparatus and method which produce tear resistant deflate holes.

It is another object of the present invention to provide a method and apparatus for limiting the shrinkage of film in the vicinity of a deflate hole while the hole is being punched.

The use of a heated punch is usually limited to punching a single layer of film since in thermoplastic films which melt readily a bead is formed around the hole. Layers of film therefore tend to stick together through the beads. Thus, it is still another object of the present invention to provide a method and apparatus for punching more than one layer of film.

Yet another object of the invention is to provide a means and method of punching a deflate hole in heat shrinkable film which does not depend upon keeping the film taut.

It has surprisingly been found that these objects can be achieved by gripping the film tightly in the vicinity where the hole is to be made, and punching the film with a punch heated above the softening point of the film while controlling the shrinkage of the film. A preferred apparatus for carrying out the steps of the foregoing method comprises a heat conductive plate and a pressure pad for tightly contacting a portion of film against the plate while a heated punch makes the hole in the film. The heat conductive plate removes heat from the film and consequently controls its shrinkage. The apparatus and method of the invention may be better understood by reference to the following detailed description and drawings in which:

Figure 1:
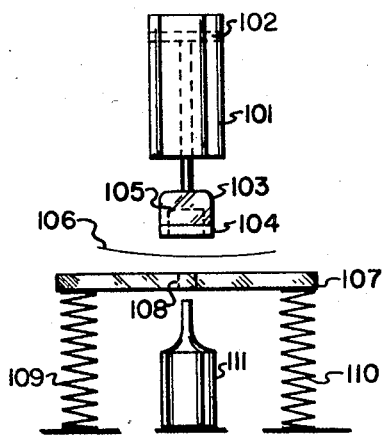
FIG. 1 shows a preferred apparatus for making deflate holes.

Turning now to FIG. 1, a sheet of film 106 can be seen on its edge. The portion of film illustrated here is from a continuous sheet of film which is being fed in a packaging operation. A pneumatic cylinder 101 is located above the film 106, and within the cylinder in dotted lines is shown piston 102 which actuates pressure pad 103. Pressure pad 103 is provided with a rubber face 104. However, any suitable resilient material could be used for the pressure face 104. Pressure pad 103 is also provided with a recessed area shown by the dotted lines and designated 105. This recessed area 105 is adapted to receive tip of heated punch 111. Hole 108 which is provided in the heat conductive pressure plate 107 is also adapted so that the tip of heated punch 111 will pass therethrough. Springs 109 and 110 provide a resilient mounting for the pressure plate 107.

Figure 2:
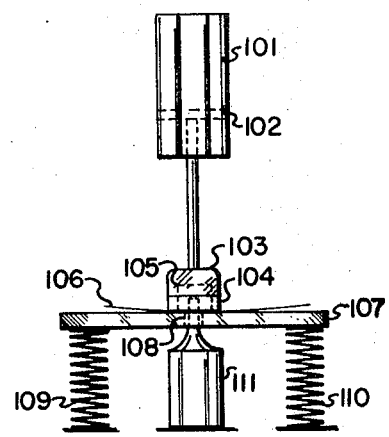
FIG. 2 illustrates the pressing of the film against the heat conductive plate of the apparatus shown in FIG. 1.

In FIG. 2 the pneumatic cylinder 101 has been actuated and piston 102 has descended thus forcing pressure pad 103 to engage film 106 against the pressure plate 107. The complete descent of piston 102 compresses springs 109 and 110 and causes the pressure plate to move downward so that the tip of heated punch 111 will extend through the hole 108 into the recessed area 104 and pressure pad 103 thus forming a hole in film 106. The heat from the punch may cause a bead to be formed around the periphery of the hole in the film 106 depending upon the particular film used. The heat conductive pressure plate 107, which acts as a heat sink, removes excess heat from the vicinity of the hole. After the hole has been punched the piston is retracted to be reactuated when another predetermined quantity of film 106 has been fed in the packaging operation. The apparatus of FIGS. 1 and 2 can be incorporated directly into almost any packaging machine for wrapping articles in heat shrinkable film. A particularly suitable wrapping machine is the one described in my aforementioned copending application.

Pressure plate 107 can be extended in length when desired and a plurality of holes 108, punches 111, pressure pads 103, and cylinders 101 provided so that a plurality of holes can be punched in the film. This is desirable where a wrapping machine is employed which wraps a plurality of packages or a single large package using a single width of film.

Figure 3:
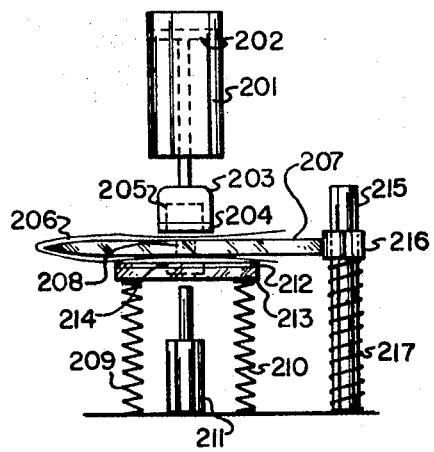
FIG. 3 shows a preferred apparatus for making a deflate hole in centerfolded or multiple layer heat shrinkable film.

In FIG. 3 another preferred embodiment of the present invention is shown. Here, a center folded film 206 is used. The film is shown edgewise and in this embodiment the film 206 would be moved or fed in the direction perpendicular to the plane in which the drawing lies. In other words, the film would be moved either into or out of the page. The film 206 moves with pressure plate 207 positioned between its folded portions. Above the film is a pneumatic cylinder 201 having a driving piston 202 therein which can move pressure pad 203 in vertical motion. Pressure pad 203 is provided with a recessed area 205 for receiving the tip of the heated punch 211 and a rubber pressure face 204 for gripping the film 206. A hole 208 is provided in pressure plate 207 so that the tip of heated punch 211 can pass therethrough. A second pressure pad 213 is provided below the plate 207. Second pressure pad 213 has a stepped opening therethrough as shown by the dotted lines and designated by the numeral 214. This opening or passage permits the tip of heated punch 211 to pass through the pad 213. Pressure pad 213 is also provided with a rubber face 212. Springs 209 and 210 resiliently carry pressure pad 213.

Pressure plate 207 is resiliently mounted in cantilever fashion being affixed to a sliding collar 216 which is slidably mounted on shaft 215. Spring 217 returns plate 207 to its original position after each stroke from piston 202.

Figure 4:
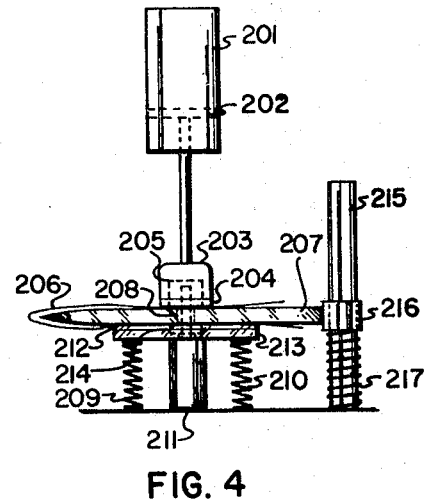
FIG. 4 illustrates the pressing of the layers of the centerfolded film against the heat conductive plate of the apparatus shown in FIG. 3; and, FIG. 5 shows an embodiment of the present invention as it would be installed in a wrapping machine.

FIG. 4 shows the actuated piston 202 forcing pressure pad 203 against film 206 thereby engaging and holding the film while the pressure plate 207 moves downward and engages the other fold of the film 206 against pressure pad 213. As springs 209 and 210 are compressed the heated tip of punch 211 extends through the stepped hole 214, the hole 208 in pressure plate 207, and into the recessed opening 205 in pressure pad 203. Thus, the heated punch 211 makes a hole in both the upper and lower folds of film 206 and pressure plate 207 again acts as a heat sink to conduct heat away from the vicinity of the holes. The embodiment shown in FIGS. 3 and 4 can also be employed in wrapping machines which employ heat shrinkable film and feed off a predetermined amount of film for each package in an intermittent operation. This embodiment can also be used where film is manually pulled from a film supply source by an operator.

The springs 109, 110, 209, 210 and 217 described above can be replaced by other suitable resilient means. For instance, dash-pots could be used. Also, pressure plate 207 in FIG. 3 could be fixedly mounted and flexed with each stroke of the piston 202.

A typical thickness for the pressure plates 107 and 207 would be about 0.125 inch and a typical material would be aluminum. Metals having high thermal conductivity are preferred; and aluminum, copper alloys, silver alloys, and magnesium are the best conductors. The invention is not limited to a particular metal or plate thickness. In high speed packaging operations and for certain types of heat shrinkable film the pressure plate 107 and 207 alone may not conduct away enough heat. In this event, cooling coils could be provided either in the plate or at one end of the plate to increase the thermal gradient. A fan could be provided to blow over and cool the plate so that a combination of convection and conduction would be utilized to remove heat from the film. The invention is not limited to any particular material for the plate as any heat conductive material will be generally satisfactory; and, the invention is not limited to conductive heat removal as convection cooling can also be used.

In the embodiments described above the heated punches 111 and 211 remain stationary. However, the invention is not limited to a stationary punch as the punch could be made to move. In the embodiments in FIG. 1, for instance, springs 109 and 110 could be deleted and plate 107 could be fixedly mounted. In a modification such as this, pressure pad 103 would first engage the film against plate 107 and then heated punch 111 would be driven by actuating means into hole 108.

The heated punches 111 and 211 will usually be electrically resistance heated; but, they could be heated by steam lines or other means. The temperature of the punch must be above the melt point of the particular film being used if a bead is to form around the punched hole. However, in certain films, e.g. cross-linked thermoplastic film such as highly irradiated polyethylene, the film does not become a definite liquid above its melting point so that it will flow sufficiently to form a bead. In the irradiated films which have been oriented, the heated punch causes the film immediately adjacent the hole to shrink and produce a thickened edge; so, in the appended claims the punch temperature is not to be construed as a temperature that will cause a beaded hole to form. However, it is usually desirable that the punch be above the melting point of the material from which the packaging film is made as sufficient softening of the film takes place above the melting point; and, for oriented films, sufficient shrinking to thicken the edge of the hole will occur.

Numerous wrapping films can be employed with the subject invention with the advantage of the subject invention being greatest for the heat shrinkable films. However, the invention is not limited to use with any particular film. Examples of the heat shrinkable films are uniaxially or biaxially oriented polyethylene, polypropylene, polyvinyl chloride, polymers of vinylidene chloride, and rubber hydrochloride.

Figure 5:
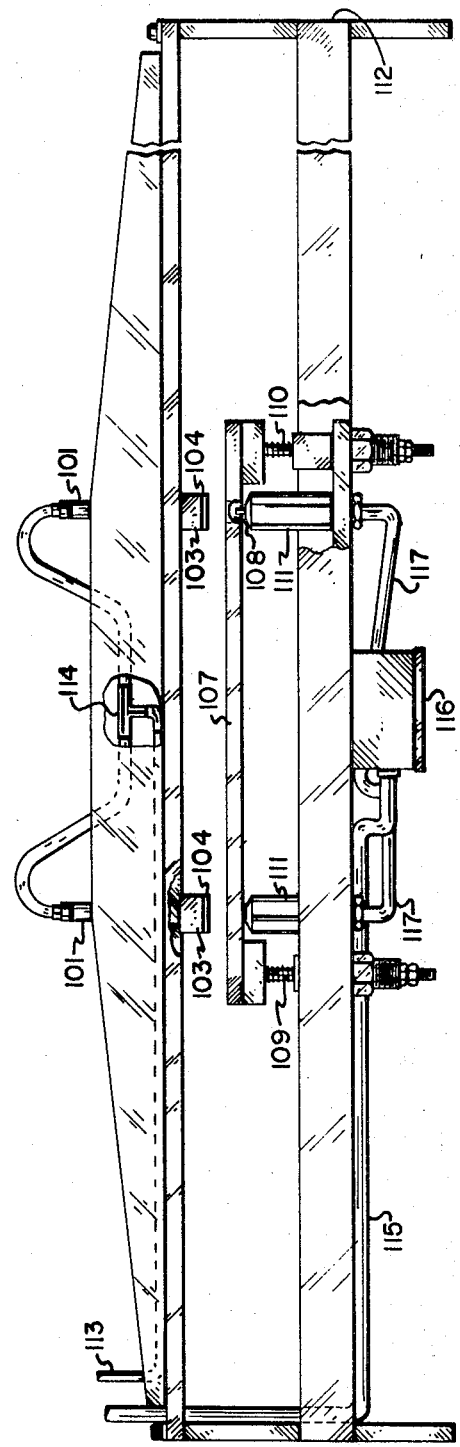

FIG. 5 shows an embodiment of the invention as it would be installed in a wrapping machine of the type described in my aforementioned copending application. This embodiment is adapted for punching holes in single sheets of film as is the embodiment in FIG. 1. The same numerals in the 100 series are therefore used to designate the parts. In addition, frame 112 is included which carries the punches 111, pressure plate 107, and pneumatic cylinders 101. Pneumatic lines 113 carry compressed air to cylinders 101 through T junction 114, and electrical cable 115 transmits current to junction box 116 where the current is distributed to resistance heated punches 111 by lines 117. In this embodiment the film passes perpendicular to the plane of the drawing through the space between pressure pads 103 and pressure plate 107.

Many modifications of the present invention will be possible by those skilled in the art. However, the scope of the invention is limited only by the following claims.

I claim:

1. An apparatus for making tear resistant holes in folded thermoplastic packaging film comprising:
   a. a punch;
   b. means for heating said punch to at least the softening point of said film;
   c. a heat conductive plate which contacts the areas of film in which a hole is to be punched; and,
   d. film contacting means located above and below said plate for moving said film into contact with said punch as one fold of said film passes above said plate and another fold passes below said plate, said folds being in position to be punched.

2. An apparatus for making tear resistant holes in thermoplastic packaging film comprising:
   a. a punch;
   b. means for heating said punch to above the melting point of said film;
   c. a cantilever mounted, heat conductive pressure plate having a hole therein adapted to receive the tip of said heated punch, said mounting being resilient;
   d. a first pressure pad positioned above said hole and adapted for securely contacting said film and further adapted for receiving the tip of said heated punch;
   e. a second pressure pad having a stepped hole therein for receiving the tip of said heated punch;
   f. means for actuating said first pressure pad;
   g. resilient mounting means for said second pressure pad whereby when a portion of said film is placed between said first pressure pad and said pressure plate and another portion of said film is placed between said second pressure pad and said plate, a hole will be made in both portions of film upon the actuation of the first pressure pad.